United States Patent
Posey

[11] 3,853,160
[45] Dec. 10, 1974

[54] ROUTER
[76] Inventor: Lawrence Posey, 65 Main Parkway, Plainview, L. I., N.Y. 11803
[22] Filed: July 20, 1973
[21] Appl. No.: 381,064

[52] U.S. Cl. ......... 144/137, 144/134 A, 144/136 R, 144/136 C, 144/144 R, 90/12 D
[51] Int. Cl. ............................................. B27c 5/10
[58] Field of Search ....... 90/12 D, 12 R; 144/134 R, 144/134 A, 134 D, 136 R, 136 C, 144 R, 137, 218

[56] References Cited
UNITED STATES PATENTS

| | | | |
|---|---|---|---|
| 2,672,898 | 3/1954 | Schuster | 144/136 C |
| 2,705,032 | 3/1955 | Pearson | 144/136 C X |
| 2,756,785 | 7/1956 | Godfrey | 144/136 C X |
| 2,839,107 | 6/1958 | Emmons | 144/218 |
| 3,207,193 | 9/1965 | Godfrey et al. | 144/144 R |

Primary Examiner—Andrew R. Juhasz
Assistant Examiner—W. D. Bray
Attorney, Agent, or Firm—Curtis, Morris & Safford

[57] ABSTRACT

A router for cutting a step or ledge in the edge of a workpiece includes an adjustable support platform which is adapted to engage one of the sides of the workpiece in a plane extending generally perpendicular to the axis of rotation of the router bit, above the free cutting end of the bit, thereby to control cutting depth of the bit into that side of the workpiece. In addition, the router includes an edge guide member adjustably mounted on the housing and having a pointed guide bar positioned to engage another side of the workpiece, along a line extending generally perpendicular to that side and below the free cutting end of the bit, thereby to control the lateral depth of cut of the bit into the side of the workpiece, perpendicular to the axis of rotation of the bit.

4 Claims, 3 Drawing Figures

ROUTER

The present invention relates to routers and more particularly to a woodworking router which is adapted to cut sharp right-angled corners in an interior edge of a workpiece.

The use of routers for cutting grooves, steps or ledges in workpieces is well known in the woodworking art and although previously proposed routers have great flexibility there are certain limitations in their use for particular applications. For example, in fabricating wood pieces having an interior opening whose peripheral edge is to be stepped or grooved, it is often difficult to maintain the cutting bit of the router in a predetermined fixed position with respect to the interior edge being stepped. Moreover, where the opening whose edge is being stepped has angular corners, it is often difficult to form the step properly at the corner. This is particularly a problem with respect to the fabrication of high quality cabinet doors wherein an inlaid piece of glass or veneer is to be inserted within a recess defined by an interior opening or cut in the cabinet. In such cases, the recess is completely enclosed by the periphery of the panel and the corners of the recess are generally square, as are the corners of the glass or veneer panel to be inserted. Thus, when routing the edges of the recess in order to form a step or ledge on which the glass panel can be mounted, additional labor is often required to finish the corners of the ledge so that they are square enough to properly mate with and receive the square corners of the inserted glass or veneer sheet.

Accordingly, it is an object of the present invention to provide a router device which is adapted to cut a groove or step in the edge of a workpiece.

Yet another object of the present invention is to provide a router which has a pair of guide members positioned to maintain the cutting bit in a fixed position with respect to the edge of a workpiece being cut.

Another object of the present invention is to provide a router device which is adapted to cut substantially square corners in the corners of a recess in a workpiece.

The above, and other ojbects, features and advantages of the present invention will be apparent from the following detailed description of an illustrative embodiment of the invention which is to be read in connection with the accompanying drawings, wherein.

Figure 1:
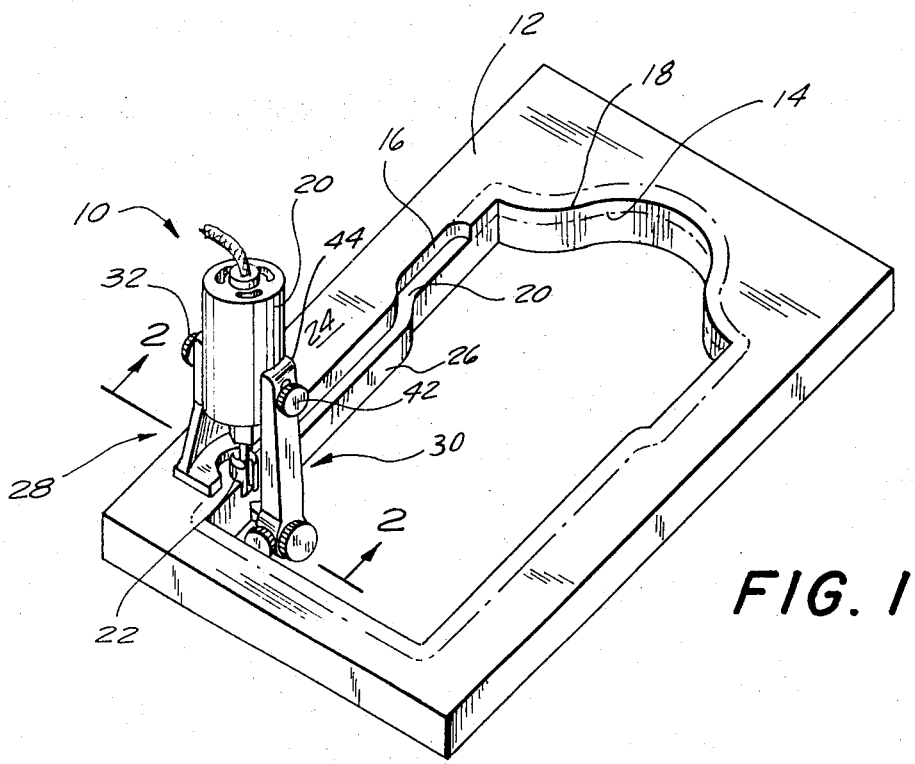
FIG. 1 is a perspective view of a router constructed in accordance with the present invention and shown in position during operation.

Referring now to the drawing in detail, initially to FIG. 1 thereof, it will be seen that a router 10, constructed in accordance with the present invention, is shown in position during a cutting operation on a cabinet door panel 12 or the like having a central recess or opening 14 which has previously been cut therein by another apparatus. The router 10 of the present invention is used to cut a step or ledge 16 in the edge 18 of recess 14 so that a glass, plastic or veneer panel can be seated on the surface 20 of the completed ledge and held therein by the later application of a molding or adhesive.

In order to cut the ledge or step 16 in edge 18, router 10 includes a housing 20 which contains an electric motor (not seen) directly coupled to drive a cutting bit 22 of conventional construction. As described hereinafter, housing 20 and cutting bit 22 are guided with respect to the two angularly related sides 24, 26 of workpiece 12, which sides define the internal edge 18 of the workpiece opening 14. As a result, cutting bit 22 is held in a relatively fixed position with respect to edge 18 so that the dimensions of ledge 16 are maintained substantially the same throughout a cutting operation in which the router is moved about edge 18.

Figure 2:
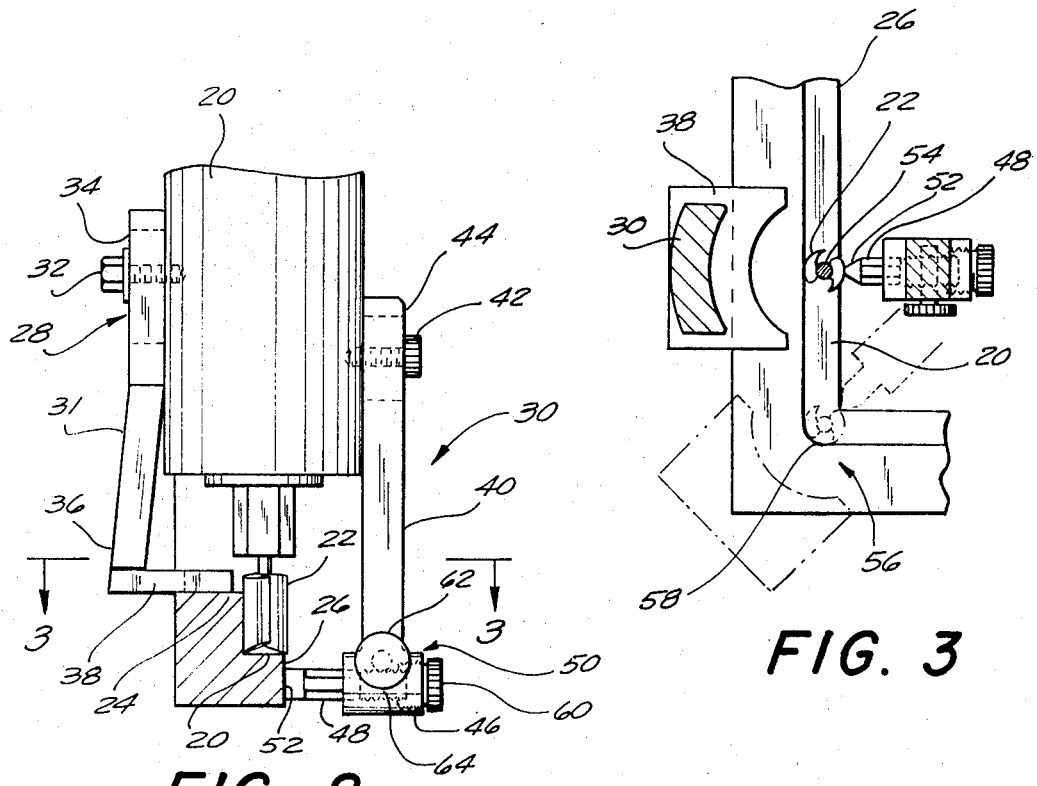
FIG. 2 is a partial elevational view taken along lines 2—2 of FIG. 1.

This guiding operation is provided by a pair of guide members 28, 30 respectively which cooperate with the sides or surfaces 24, 26. Guide member 28, as seen most clearly in FIG. 2, serves to control the depth of cut of bit 22 into surface 24 at edge 18. Guide member 28 consists of an elongated leg 31 which is vertically adjustably mounted on housing 20 by a bolt 32 which extends through a slot 34 in the upper end of the leg. Thus, by loosening bolt 32, the vertical position of leg 31 with respect to housing 20 can be adjusted and thence fixed by subsequent re-tightening of bolt 32.

The lower end 36 of leg 31 has an enlarged support platform or surface 38 formed thereon. This surface is positioned to rest upon the surface 24 of the workpiece. Thus, during use of the router, the operator holds the surface 38 against surface 24 of workpiece 12 to maintain a constant depth of cut of the router in the workpiece. As mentioned, in order to adjust this depth, the position of leg 31 is varied with respect to housing 20 and thus to bit 22, by theuse of bolt 32.

The lateral positioning of bit 22 with respect to edge 18 is adjusted by the guided member 30. This guide member, as also seen most clearly in FIG. 2, includes a vertical leg 40 which is also vertically adjustably mounted on housing 20 by means of a bolt member 42 and a slot 44 formed in the upper end of the leg. Thus, upon loosening of bolt 42, the vertical position of leg 40 with respect to the housing 20 can be varied within the limits of the slot 44. Once the desired vertical position is set the bolt 42 is tightened.

Figure 3:
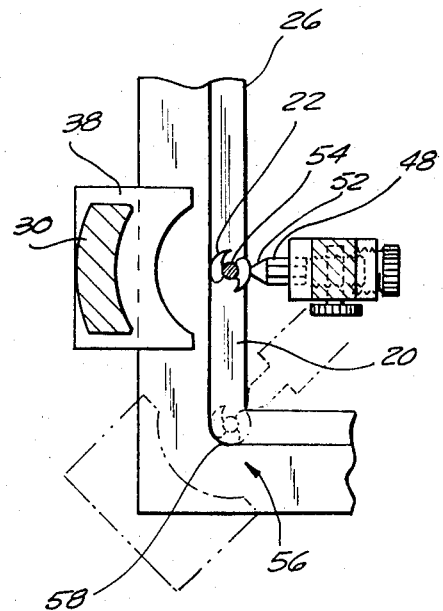
FIG. 3 is a plan view taken along line 3-3 of FIG. 2 showing the operation of the device cutting through a corner of a recess.

The lower end 46 of guide member 30 provides mounting support for a laterally extending guide bar 48. The latter is laterally adjustable with respect to leg 40 by an adjustment mechanism 50, more clearly described hereinafter. Guide bar 48 has a sharply pointed tip 52 formed on the free end thereof and located for engagement against the side 26 of the recess 14. The pointed edge 52 of the guide bar extends vertically and generally parallel to the axis of rotation 54 of the bit 22. Thus, as seen in FIG. 3, the lateral position of bit 22 will be held constant with respect to the edge or side 26 of the workpiece during movement of the router along edge 18.

Preferably, the lateral position of the edge 52 of guide bar 48 is adjusted, through adjustment mechanism 50, to be slightly inside of the periphery of the drill bit 22. Thus, when cutting along a straight edge, as seen in FIGS. 1 and 3 (in solid lines), the periphery of the cutting bit 22 will be located slightly outside of the side 26. However, as the router is moved through an angular corner, such as the corner 56 seen in FIG. 3, the pointed edge 52 of the guide bar 48 will enter the corner and the bit 22 will cut through the corner along a width which is substantially equal to its diameter. Thus, by providing the pointed tip 52 on the guide bar 48, the deepest possible cut is made by the bit 22 at the corner so that the edge 58 of the step at corner 56 thereby is made substantially square. As a result, a glass, plastic or veneer panel having square corners, can be directly placed in the routed step 16 and seated on the surface 20 thereof without additional work in finishing the corner edges 58. This was not heretofore possible with previously proposed routers which did not have guide members which permitted the cutting bit to cut substantially square corners. Most previously proposed routers were either simply manually guided, which of course resulted in unsatisfactory and normally irregular cuts being made in the workpiece, or with guide members which were not capable of navigating a square corner during the cutting operation.

As previously mentioned, the lateral position of guide bar 48 can be adjusted with respect to surface 26 so as to modify the lateral depth of the cut made at the edge 16, thereby to modify or adjust the width of the surface 20 formed by the router. This is accomplished by the adjusting mechanism 50 which includes a pair of adjustment bolts 60, 62. Each of these adjustment bolts cooperate respectively with the threaded end portion 64 of guide bar 48. Adjustment bolt 62 has a worm type thread formed thereon for cooperation with the threads on end 64 of bolt 48 so that rotation of the bolt 62 causes lateral movement of the bar 48. Bolt 60 on the other hand has internal and external threads formed thereon. The external threads mount the bolt within collar 46 while the internal threads are adapted to be threadedly engaged with the threads on the end 64 of the guide bar. In this manner, the adjustment member 60 can lock the guide bar 48 against lateral movement when the lateral position thereof is adjusted by bolt 62.

Accordingly, when it is desired to adjust the lateral position of guide bar 48, bolt 60 is unthreaded to disengage it from the end 64 of the guide bar. Thence, bolt 62 can be operated to move the guide bar laterally so as to vary the location of the free end 52 thereof with respect to the axis of rotation of the bit 22. When the desired lateral adjustment is completed, bolt 60 is turned back into engagement with the end 64 of the guide bar until it is tight. This operation of bolt 60 will not cause rotation of guide bar 48 since that guide bar has a generally hexagonal cross-section, rearwardly of the pointed tip 52, which slides in a complementary aperture in collar 46 during adjustment and which thereby prevents roration of the guide bar during rotation of either of the bolts 60 or 62.

Of course, it is contemplated that other convenient types of adjustment mechanisms can be provided for laterally adjusting the guide member 48. The important criteria of the guide bar being the provision of the pointed tip 52 which permits the guide bar to enter tightly into the corners of a workpiece below the bit, so that the cutting bit can cut a substantially square recess at the corner without the necessity of later finishing work by the operator.

Accordingly, it is seen that a relatively simple and inexpensively constructed router is provided which is adapted to form finished cut corners as steps or ledges in a workpiece with the steps or ledges being accurately formed in depth and width. The device is highly suitable to manual operation since the operator simply holds the router tightly against the workpiece and maintains the support surface 38 and the edge 52 of the respective guide members in engagement with the workpiece in order to form the step 16.

Although an illustrative embodiment of the present invention has been described herein with reference to the accompanying drawings, it is to be understood that the invention is not limited to that precise embodiment and that various changes and modifications may be effected therein by one skilled in the art without departing from the scope or spirit of this invention.

What is claimed is:

1. A device for cutting a step in the edge of a workpiece having a pair of angularly related surfaces defining said edge, said device comprising a router including a housing and a driven rotary cutting bit having a free cutting end, a support platform operatively connected to said housing and having a guide surface adapted to engage one of the sides of the workpiece in a plane extending generally perpendicularly to the axis of rotation of said bit above the free cutting end of said bit for controlling the cutting depth of said bit into said one side of the workpiece along the axis of rotation, and edge guide means mounted on said housing for maintaining said cutting bit in a predetermined relative position with respect to said edge as the router is moved therealong, said edge guide means including a guide bar having a sharply pointed tip for engaging the other of said pair of workpiece sides along a line extending generally perpendicularly to said other side and below said free cutting end of said bit and having the ability to enter, and engage the surfaces of, a square internal corner in the workpiece, thereby to control the lateral depth of cut of said bit into said one side of the workpiece perpendicularly to the axis of rotation of said bit and to allow the bit to make the deepest possible cut in a square internal corner therein of substantially the same depth from said one side as the depth of the cut along a straight portion of the side.

2. The device as defined in claim 1 wherein said edge guide means is adjustably mounted on said housing for varying the relative vertical position of said guide bar with respect to the free cutting end of said bit.

3. The device as defined in claim 2 including means for adjusting the lateral position of said guide bar along its longitudinal axis, thereby to adjust the relative lateral position of said pointed tip with respect to the axis of rotation of said bit and thus the lateral depth of cut of said bit into said one side.

4. The device as defined in claim 3 wherein said pointed tip of said guide bar has an elongated guide edge extending generally parallel to the axis of rotation of said bit.

* * * * *